April 4, 1939.　　　G. A. UNGAR　　　2,153,013
ROTARY KNIFE
Filed Aug. 16, 1935　　　2 Sheets-Sheet 1

INVENTOR.
Gustave A. Ungar
BY
ATTORNEY.

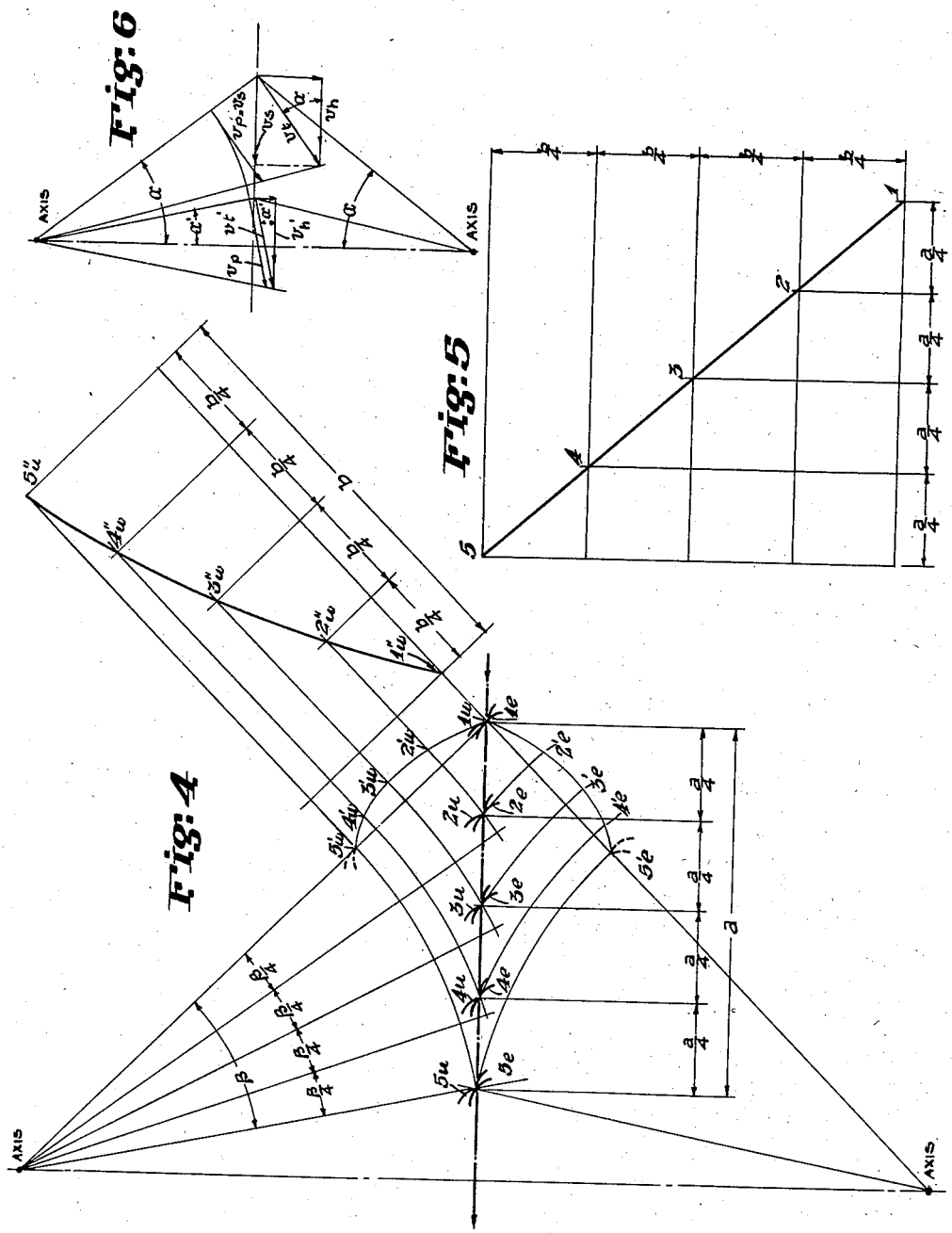

Patented Apr. 4, 1939

2,153,013

UNITED STATES PATENT OFFICE 2,153,013

ROTARY KNIFE

Gustave A. Ungar, Pelham Manor, N. Y., assignor to S & S Corrugated Paper Machinery Co., Inc., Brooklyn, N. Y., a corporation of New York Application August 16, 1935, Serial No. 36,519

9 Claims. (Cl. 164—66)

My invention relates to a novel cutting mechanism and more particularly to novel revolving or rotary shears for cutting a continuous web or sheet fed at a constant speed.

Revolving knives or rotary shear blades which cut while the sheets are fed through at constant speed must, in order to cut straight across edges and uniform sheets, fulfill the following requirements.

(a) The horizontal velocity components of the moving shear blades, while cutting takes place, must be equal to the horizontal sheet velocity, in order to prevent tearing, or buckling of the sheet.

(b) The cutting of the sheet must take place gradually, so as to prevent excessive strains on the shearing mechanism, as well as excessive power consumption.

It will be clear that the first of these is essential to prevent tearing or buckling, since the horizontal component of the shears is the forward speed at the point of cutting. If this is less than the speed at which the paper is moving, it will cause buckling of the paper—if more it will cause tearing.

The second requirement is desirable in order to avoid excessive peak loads. If the cutting time could be distributed uniformly over the entire cycle of the knife drum, then obviously less power would be required than the other extreme case in which the entire cut is a single instantaneous operation in which all the work of cutting must be accomplished in an instant. It is accordingly desirable to approach the former condition as nearly as possible.

In order to accomplish this the shear blades have in the past been arranged spirally with the shearing edge displaced along a cylindrical surface.

While such blades can be made to fulfill the above requirements, they present several pronounced disadvantages.

Because of the necessary spiral shape the manufacturing cost of the revolving blade supports, as well as of the blades is high, and replacement costs of shear blades are therefore also high. Shear blades are frequently made in sections, to overcome the difficulty of heat-treating long spiral shear blades. This of course results in interruptions of the cutting edge.

But if the cutting period is to occur over a reasonable portion of the drum cycle, it is obvious that the paper will have moved through a distance equal to the speed of the paper times the cutting time. Provision must accordingly be made for cutting the sheets at right angles to the direction of travel of the sheet.

In order to have the sheet cut-off at right angles to the sheet travel, it is necessary to mount the axes of the revolving blade holders at an angle (equal to the helix angle of the spiral blades). This necessitates arranging the driving mechanism at an angle to the feeding mechanism, i. e., none of the drive shafts excepting the shafts for the feed rolls can be parallel with the frame of the machine.

My invention contemplates a novel construction of knives that eliminates all these difficulties.

Accordingly objects of my invention are to provide, substantially straight shear blades; plane shear blade supporting surfaces on the revolving blade supports; axes of the blade supports in a plane at right angles to the direction of the sheet travel.

There are other objects of my invention which together with the foregoing will appear in the detailed description which is to follow in connection with the drawings in which, Figure 1 shows the elevation of a shear frame looking toward the frame in the direction of the sheet travel.

Figure 4 is a diagrammatic view of four points of the shears evenly spaced along the sheet width, together with a projected side view of the cutting edge of the upper shear.

Figure 5 shows a diagrammatic plan view of the line of tool travel for generating the cutting edges.

Figure 6 is a diagram showing the velocity components of the four engaging points of the shear.

Figure 1:
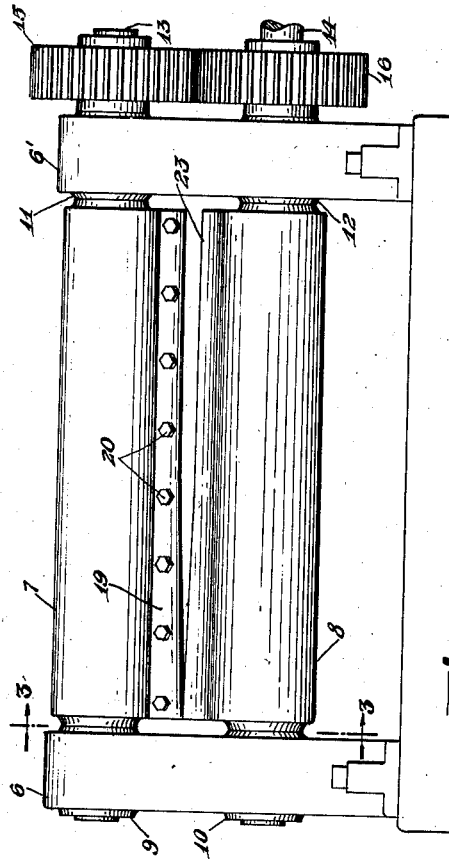

Referring specifically to Figure 4 I have shown sections of the upper and lower shear blades as they engage with each other from the left edge of the sheet (looking toward the machine) to the right edge with three evenly spaced intermediate positions. While the sheet is being cut, the angular velocity of shear blades around their axes is constant. $\beta$ represents the angle of the shear blade travel while the sheet travels the distance $a$.

If this distance $a$ is divided for instance into four equal parts $a/4$, the corresponding positions of shear blade intersections will be found to deviate at the intermediate points from the corresponding angular positions of shear blade carrier, when dividing the angle $\beta$ into 4 equal parts $\beta/4$, the angular velocity and the sheet velocity both being uniform.

At its right edge, the sheet is sheared by the shearing edge $l_u$ of the upper blade and the shearing edge $l_e$ of the lower blade. Both edge profiles are assumed to have penetrated to the center of the sheet which has thereby been sheared at this point. The shearing profiles are curved in such a manner that there will be no mutual interference as the blades continue to revolve around their axes.

After the sheet has travelled the distance $a/4$ the shearing edge profiles which then have penetrated to the center of the sheet at this instant must then be $2_u$ for the upper blade and $2_e$ for the lower blade. At this point one-fourth of the width of the sheet has been sheared. See also Figure 5.

When the sheet has travelled an additional distance $a/4$ the then co-acting shear edge profiles are $3_u$ and $3_e$. One-half of the sheet width has been sheared.

After an additional travel of $a/4$ of the sheet, the co-acting shear edge profiles are $4_u$ and $4_e$. Three-fourths of the sheet width has been sheared.

When the sheet has travelled the remaining distance $a/4$, the co-acting shear edge profiles are $5_u$ and $5_e$, and the full width of the sheet has been sheared.

In every one of the shear edge points indicated as well as in all intermediate points, the sectional profiles (in vertical planes perpendicular to the sheet, and parallel to the sheet travel) of the lower and upper blades respectively are uniform. These profiles can therefore be generated by means of suitable profile tools (milling cutters) travelling at a uniform speed, along straight line $1, 2, 3, 4, 5$, in Figure 5, which is the hypotenuse of a right triangle having as the other sides the sheet travel distance $a$ and $b$, the maximum length of the shear (maximum sheet width). While the generating tool travels along this line, the shear blade carrier is rotated at uniform speed through angle $\beta$. Any suitable mechanism can be employed for feeding the generating tool along line $1—5$, while the blade carrier revolves through $\beta$. The same tool carrier actuating mechanism is also used for grinding the shearing edges proper.

Figure 4 also shows diagrammatically the elevation of the cutting edges of both shear blades, $l_u, 2_u', 3_u', 4_u', 5_u'$, and $l_e, 2_e', 3_e', 4_e', 5_e'$, respectively, when these blades are at the beginning of the cut at the left edge of the sheet. A plan view of the upper shear blade, $l_u'', 2_u'', 3_u'', 4_u'', 5_u''$ also is shown projected at right angle to the elevation of the upper shear edge at the beginning of the cut.

Figure 2:
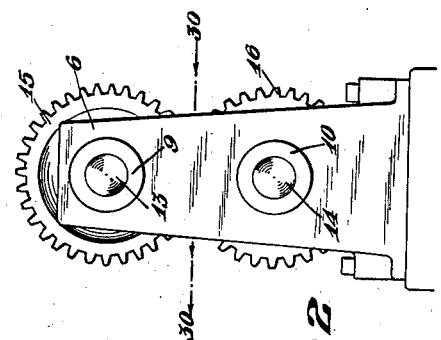
Figure 2 is a side elevation.
Figure 3:
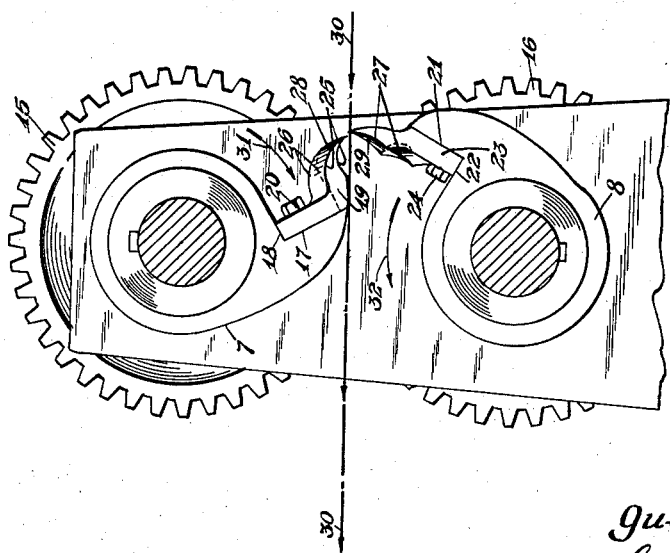
Figure 3 is a vertical section through 3—3 of Figure 1.

It will be seen from this elevation and projection, that the shearing edges are not straight lines, but slightly curved. However, the deviation from the straight is so slight that the shear blade can be made from a straight flat piece of tool steel, and therefore the supporting faces of the blade carriers are flat and in planes parallel to the blade carrier axes. The arrangement of the shear blades and their carriers is shown in the Figures 1, 2, and 3.

$6$ and $6'$ represent the frames supporting the revolving blade carriers $7$ and $8$ in bearings $9, 10, 11,$ and $12$. The shafts $13$ and $14$ to which the blade carriers $7$ and $8$ are fastened also have fastened thereto the gears $15$ and $16$ respectively, which keep the blade carriers in correctly timed relation. Blade carrier $7$ has two flat perpendicular faces $17$ and $18$ to which is fastened the upper blade $19$ by means of screws $20$. Blade carrier $8$ has two flat perpendicular faces $21$ and $22$ to which lower blade $23$ is fastened by means of screws $24$. These flat surfaces $17, 18, 21,$ and $22$ are located in planes parallel to their respective blade carrier axes and are therefore easy to machine.

The two end profiles of each shear blade as well as the shearing edges $28$ and $29$ are also shown in Figure 1. Profile $25$ corresponds to $l_u$ in Figure 4 while, $26$ corresponds to $5_u'$ in Figure 4. Profile $27$ corresponds to $l_e$ in Figure 4, while, $28$ corresponds to $5_e'$.

The direction of the sheet travel is indicated by arrows $30$; the rotation of the shear blade is indicated by arrow $32$. The blades can readily be adjusted for wear by axially shifting the blade along the supporting back edges $18$ and $22$.

It will be seen from the above that the cutting of the sheet proceeds gradually from edge to edge. The cutting angle can be chosen as very considerable ($45°$ and even more). This angle is limited only by the necessary space requirements so that each shear blade can clear the supporting bar of the other shear blade while revolving past each other.

The correct velocity is constant and indicated by $v_s$. The angular velocity of the shear blades at the pitch line of the timing gears $15$ and $16$ is also constant and indicated by $v_p$ whereby $v_p = v_s$. The horizontal components of the shear blade velocities are indicated by $v_h$.

As will be seen from the diagram, the tangential blade velocity $v_t$ at the beginning of the cut (at the left edge of the sheet) is a maximum, but its horizontal component, being the tangential blade velocity $v_t$ times the cosine of the momentary angle $\alpha$ of the blade position, is substantially identical with the sheet velocity.

As the sheet advances and the cutting progresses, the tangential blade velocity decreases, because of the decrease of the active blade radius, but the momentary blade angle $\alpha'$, also decreases and $v_h' = v_t'$ cosine $\alpha'$ remains substantially constant during the entire cutting period.

The shear blade profiles shown in the diagrams $3$ and $4$ are such as would be particularly suitable for the cutting of cardboard and the like. For sheet metal cutting the shear blade angles would have to be appropriate for metal, i. e. less acute.

For thin sheets of paper, Celluloid, rubber, etc., only one of the blades would have a knife like cutting edge, while the other blades would merely act as a steady rest for the material while the knife cuts through it. The method of generating the profile of the steady rest would be the same as that of the regular shear edges.

Although I have described a preferred embodiment of my invention, it will be understood that it may take other forms and I do not intend to be limited by these illustrations except as set forth in the appended claims.

I claim:

1. In a cutting mechanism for continuous strip material; a blade carrier; a drive for said carrier; a blade rigidly mounted on said carrier the active knife radius varying continuously from one end to the opposite end in an amount to produce a substantially constant horizontal component of the blade velocity at each successive cutting edge as it engages the sheet; said carrier being mounted at right angles to the directions of travel of the web material to be cut and said blade having a shearing profile so shaped as to cut a straight edge at right angles to the direction of web travel.

2. In a cutting mechanism for continuous strip material; a blade carrier axis; a blade carrier having two surfaces in planes parallel to the blade carrier axis and a blade edge rigidly mounted in said carrier the active knife radius varying continuously from one end to the opposite end in an amount to produce a substantially constant horizontal component of the blade velocity at each successive cutting edge as it engages the sheet.

3. In a cutting mechanism for continuous strip material; a drum; a blade carrier having two surfaces in planes parallel to the blade carrier axis and a blade edge rigidly mounted in said carrier, the active knife radius varying continuously from one end to the opposite end in an amount to produce a substantially constant horizontal component of the blade velocity at each successive cutting edge as it engages the sheet, and said carrier being mounted at right angles to the direction of travel of the web material to be cut.

4. In a cutting mechanism for continuous strip material; a drum; a blade carrier having two surfaces in planes parallel to the blade carrier axis and a blade edge rigidly mounted in said carrier, the active knife radius varying continuously from one end to the opposite end in an amount to produce a substantially constant horizontal component of the blade velocity at each successive cutting edge as it engages the sheet, and said carrier being mounted at right angles to the direction of travel of the web material to be cut, and the blade edge being shaped so that the web will be cut in a line at right angles to the directions of travel of the web.

5. In a cutting mechanism for continuous strip material; a blade carrier axis; a blade carrier having two surfaces in planes parallel to the blade carrier axis and a blade edge rigidly mounted in said carrier, the active knife radius varying continuously from one end to the opposite end in an amount to produce a substantially constant horizontal component of the blade velocity at each successive cutting edge as it engages the sheet, and a second blade carrier axis; a blade carrier having two surfaces in planes parallel to the blade carrier axis and a blade edge mounted on said second carrier.

6. In a cutting mechanism for continuous strip material; a blade carrier axis; a blade carrier having two surfaces in planes parallel to the blade carrier axis and a blade edge rigidly mounted in said carrier, the active knife radius varying continuously from one end to the opposite end in an amount to produce a substantially constant horizontal component of the blade velocity at each successive cutting edge as it engages the sheet, and a second blade carrier axis; a blade carrier having two surfaces in planes parallel to the blade carrier axis and a blade edge mounted on said second carrier, and said carriers being mounted at right angles to the directions of travel of the web material to be cut.

7. In a cutting mechanism for continuous strip material; a blade carrier axis; a blade carrier having two surfaces in planes parallel to the blade carrier axis and a blade edge rigidly mounted in said carrier, the active knife radius varying continuously from one end to the opposite end in an amount to produce a substantially constant horizontal component of the blade velocity at each successive cutting edge as it engages the sheet, and a second blade carrier axis; a blade carrier having two surfaces in planes parallel to the blade carrier axis and a blade edge mounted on said second carrier, and said carriers being mounted at right angles to the directions of travel of the web material to be cut, and the blade edges being shaped so that the web will be cut in a line at right angles to the direction of travel.

8. In a cutting mechanism for continuous strip material; a first and second blade carrier; a drive for said carriers; a blade mounted on each of said carriers; said carriers being mounted at right angles to the directions of travel of the web material to be cut and said blades having shearing profiles so shaped as to cut a straight edge at right angles to the direction of web travel; the ends of the blades' edges being in a plane with the axis of the carriers, and the blades between the ends forming a slight curve; the intermediate points of the blades deviating sufficiently to permit the shearing edges of both blades to intercept at progressive points on the web, which for equal rotation of the blades' carriers are spaced equal distances apart.

9. In a cutting mechanism for continuous strip material; a blade carrier; a drive for said carrier; a blade mounted on said drum; said drum being mounted at right angles to the directions of travel of the web material to be cut and said blade having a shearing profile so arranged as to cut a straight edge at right angles to the direction of web travel; the knife forming a constantly varying angle $\alpha$ with the web which varies as a function of the variation of the tangential constant horizontal component velocity.

GUSTAVE A. UNGAR.